Oct. 18, 1949.　　　　V. MARASCO　　　　2,484,954
CHILD'S VEHICLE
Filed Oct. 10, 1945　　　　　　　　2 Sheets-Sheet 1
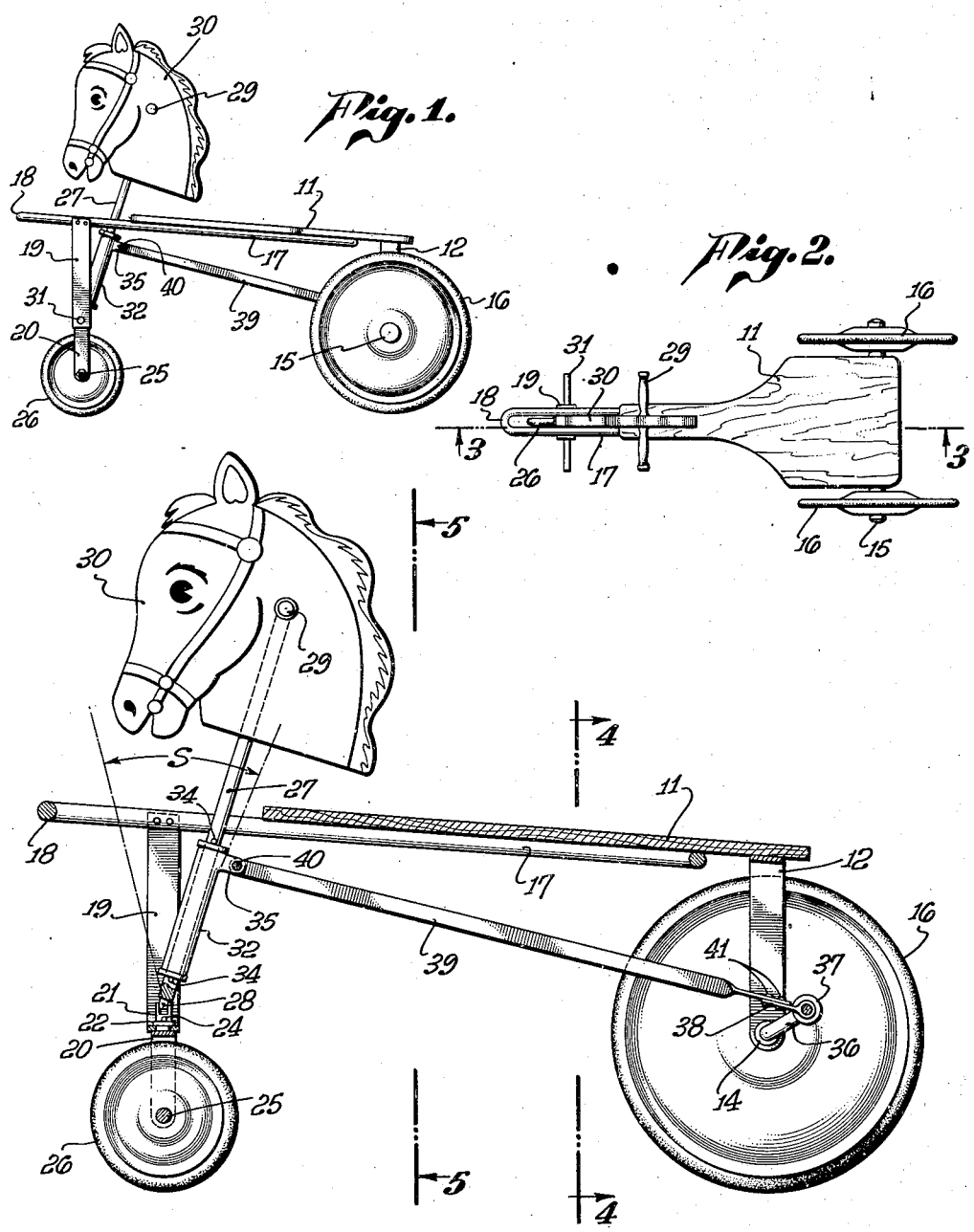
INVENTOR
Vincent Marasco,
BY
ATTORNEY Oct. 18, 1949.  V. MARASCO  2,484,954
CHILD'S VEHICLE
Filed Oct. 10, 1945  2 Sheets-Sheet 2
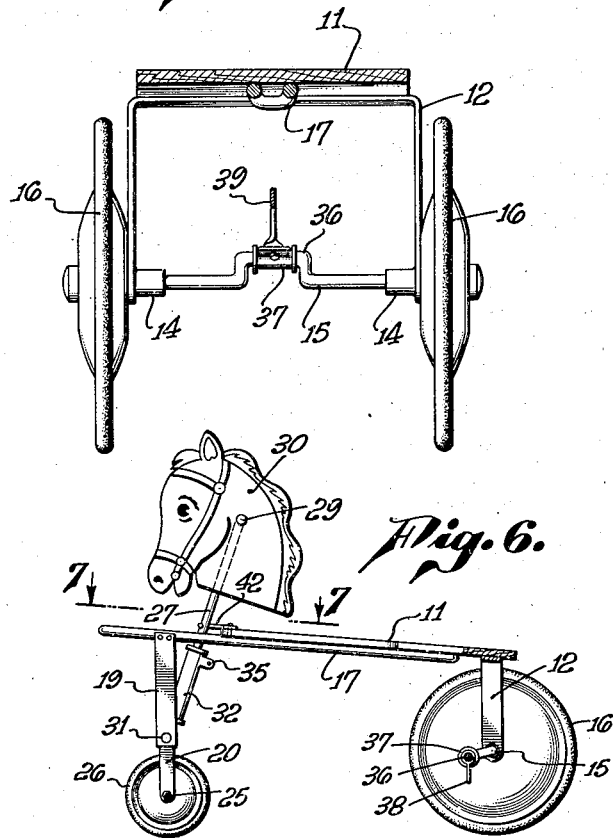
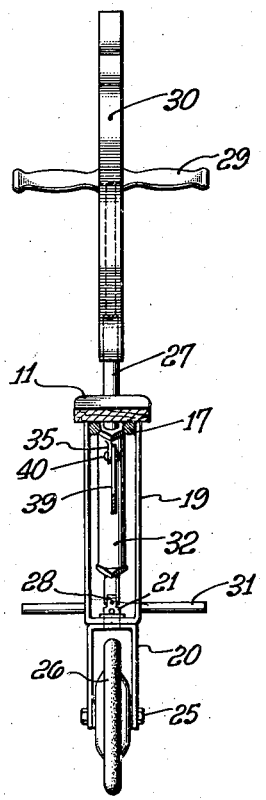
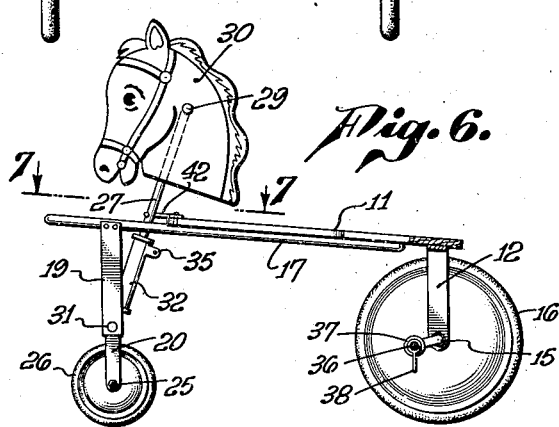
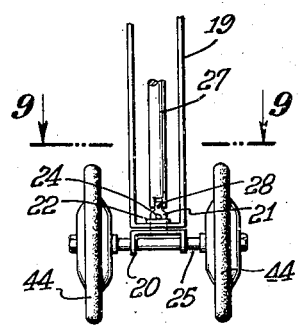
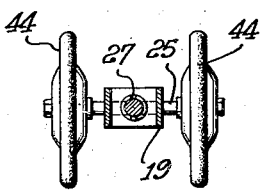
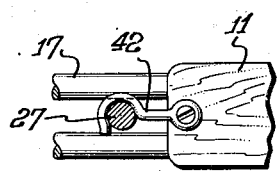
INVENTOR
Vincent Marasco,
BY
ATTORNEY Patented Oct. 18, 1949

2,484,954

UNITED STATES PATENT OFFICE 2,484,954

CHILD'S VEHICLE

Vincent Marasco, Los Angeles, Calif.

Application October 10, 1945, Serial No. 621,477

2 Claims. (Cl. 280—240)

My invention relates in general to vehicles for children and more particularly to play vehicles which may be propelled and steered by the child while seated astride thereof. Vehicles of this type have in the past usually required coordinated action of the child's arms and legs, either being propelled by the feet and steered with the hands, as in a velocipede, or propelled by the hands and steered with the feet, as in those vehicles commonly known as Irish mails. While training in such coordination may be desirable, it is frequently beyond the capabilities of children who have graduated from their perambulators and are ready for some form of self-propulsion. For such children vehicles are provided upon which the child may sit or stand astride, propelling the same by pushing on the ground with the feet and thus learning dynamic balance. The vehicle which is the subject of this invention is intended as an intermediate step between the vehicles above described.

It is a principal object of my invention to provide a vehicle upon which the child may sit astride and which may be both propelled and steered by the arms alone, while the child's feet are braced to give purchase for the muscular activity of the upper body.

A further object is to provide a vehicle which may readily be converted to one which may be propelled by an adult with child's feet supported, or by the child's feet pressing upon the ground, and which may be used to teach the child walking, steering, and dynamic balance, and which furthermore may be easily reconverted to the more advanced type of arm-propelled vehicle as the child grows in capability.

Yet another object is to provide a vehicle upon which the more advanced child may learn coordinated use of his arms to achieve propulsion and steering at the same time.

These and other objects of my invention will become apparent from the following description of preferred and modified forms thereof, and from the accompanying drawings, illustrating those forms, in which:

Fig. 1 is a side elevation of a vehicle according to my invention;

Fig. 2 is a plan view showing more particularly the foot-rest and operating handles in their relation to the seat;

Fig. 3 is an enlarged sectional view taken on the line 3—3 of Fig. 2;

Fig. 4 is a transverse section on the line 4—4 of Fig. 3 and showing in detail the mounting of the rear, or driving wheels;

Fig. 5 is a transverse section on the line 5—5 of Fig. 3, illustrating the steering column and the mounting of the front, or steering, wheel;

Fig. 6 is a view similar to Fig. 1, and on the same scale, but partly cut away to illustrate the removal of the connecting rod for adapting the invention for very young children;

Fig. 7 is a fragmentary plan view on line 7—7 of Fig. 6, showing the fastening means for immobilizing the propelling means when the connecting rod has been removed;

Fig. 8 is a fragmentary front elevation on the scale of Figs. 3 to 5, illustrating a modification in which a double front wheel is mounted for greater stability; and Fig. 9 is a horizontal section on the line 9—9 of Fig. 8.

Referring to the accompanying drawings, and with particular reference to Figs. 1 to 5, it will be seen that 11 indicates a seat cut away in its forward portion to allow a child free use of the legs when either seated thereon or standing astride thereof. The seat 11 is supported at its rearward portion by a bracket strap 12 having downwardly extending arms fitted with journals 14 for rotatably engaging the rear axle or shaft 15 upon which the rear wheels 16 are secured. The forward constricted portion of the seat 11 is secured to and supported by a longitudinal frame member 17 comprising two parallel bars preferably joined at their forward and rearward ends, as shown in Figs. 2 and 4, to form an elongated narrow loop, the forward end of which, indicated at 18, extends forwardly of the seat 11 and forms a guide for the hereinafter described propelling rod. The arms of a bracket 19 are rigidly fastened to the bars forming the loop 18 and a hanger 20 is joined to the bracket 19 with a swivel joint comprising a stud 21 fastened to the hanger 20, a washer 22, and pin 24 through the stud 21 above the washer. The arms of the hanger 20 engage the front axle 25 upon which the front wheel 26 is rotatably mounted, forming therewith and with the swivel joint formed about the stud 21, a steering assembly for the vehicle.

A propelling and steering rod 27 is connected to the upper end of the stud 21 by a universal joint 28, the preferred form of joint being a link having two pairs of pivot pins carried pivotally in bearing openings in the ends of the rod and stud, the respective pairs of pivot pins being at right angles to each other, but other well known mechanical devices giving universal movement may be substituted therefor. The rod 27 extends upwardly through the loop 18 and is provided with operating handles 29. An ornamental device such as the horse's head 30 may be carried by the rod 27, the handles 29 extending laterally therefrom. Foot-rests 31 are affixed to, and extend laterally from, the arms of the bracket 19.

By means of the universal joint 28, the rod 27 may be rotated to cause directional rotation of the steering assembly, and may also be given angular movement relative to the vehicle as a whole within the confines of the loop 18, as shown by arrows at S in Fig. 3, and the rotatory and relative angular movements may be made simultaneously or selectively. The rod 27 and loop 18 are proportioned to permit a sliding fit of the one within the other, whereby the parallel bars of the frame member 17 act as guides for the rod 27 to constrain the angular movement thereof relative to the rest of the vehicle to a substantially vertical longitudinal plane. It will be seen that rotation of the steering assembly may be accomplished regardless of the forward or backward position of the rod 27 within the loop 18, and that the relative angular movement of the rod is equally independent of the degree of rotation of the steering assembly.

To propel the vehicle by means of the angular movement of the rod 27, the rod is provided with a sleeve 32, rotatable thereon but held against sliding longitudinally with respect thereto by pins 34. The sleeve 32 is provided with an ear 35. The rear axle 15 has an off-set portion 36 forming a crank, upon which is rotatably mounted a connecting rod bearing 37 having a short stub arm 38. A connecting rod 39 is pivotally affixed to the ear 35 as by a bolt 40, and to the stub arm 38 by bolts 41. Angular reciprocation of the rod 27 through the vertical arc S, in which it is constrained to move by guide means 18 and connecting rod 39, is thus transmitted as rotary motion to the rear axle and to the rear wheels 16 secured thereto.

To propel the vehicle, the child imparts backward and forward angular movement to the rod 27 through the handles 29, and the vehicle is steered by imparting rotary movement to the rod 27 by the same means, these movements being, as aforesaid, independent and selective or simultaneous as the child may desire.

As a young child may not have the coordination necessary to steer and propel the vehicle simultaneously, and as it may be desired to use the vehicle as an air in teaching the child to walk or as a vehicle to be pushed or pulled by an adult, the connecting rod 39 is readily removable by removal of the bolts 40 and 41, this condition being illustrated in Fig. 6. Removal of the connecting rod 39 makes angular reciprocation of the rod 26 not only pointless but overly free and apt to be confusing to the child and I therefore may provide means for engaging said rod to hold it against angular movement. For this purpose, as shown in Figs. 6 and 7, the vehicle may be provided with a hook 42, attached to the forward end of the seat 11 for movement out of and into engagement with the rod 27 when said rod is in a suitable angular position. When so engaged, as shown in these figures, said hook prevents angular movement of said rod. The child may then walk astride of the narrow forward end of the seat 11, grasping the handles 29 for support and for steering, or may sit on the seat and propel the vehicle by pushing on the ground with his feet.

As a further aid to very young children for whom a higher degree of vehicular stability is desired, I may provide the modification shown in Figs. 8 and 9, in which double front wheels 44 give greater lateral support. The bracket 19 and rod 27 are extended downward between the wheels and the hanger 20 is correspondingly shortened and engages the front axle 25 between the wheels, the axle being at least of a length to allow rotation of the wheels around the arms of bracket 19. The increase in length of the rod 27 below the ear 35 reduces the leverage applicable to the driving mechanism and increases the safety of the vehicle by making the attainment of upsetting speeds more difficult.

Having now described and shown preferred and modified forms of my invention I wish it understood that this is merely for illustrative purposes and that various changes in design, structure and arrangement may be made without departing from the spirit and scope of the invention which is defined in the appended claims.

I claim:

1. A vehicle comprising a body; driving wheels rotatably mounted on the body; steering means mounted on the body for rotation about an approximately vertical axis; front wheel means rotatably mounted on said steering means; an upwardly extending steering rod above said steering means; a universal joint connecting the rod to the steering means to rotate said steering means upon rotation of the rod while permitting relative angular movement of the rod; drive mechanism including a detachable connecting-rod member connecting said steering rod to the driving wheels to rotate the driving wheels upon said angular movement of the steering rod, said steering rod rotatably engaging said drive mechanism; and means for securing said steering rod to the body to prevent said relative angular movement of said rod.

2. A vehicle comprising a body provided with a seat and with guide means forwardly of said seat extending longitudinally of said body, driving wheels rotatably mounted on the rearward portion of said body, steering means mounted on the forward portion of said body for rotation about an approximately vertical axis, front wheel means rotatably mounted on said steering means, an upwardly extending rod located forwardly of said seat, universal joint means connecting said rod to said steering means to cause rotation of said steering means upon rotation of said rod while permitting relative angular movement of said rod, said rod engaging said guide means to constrain said rod to angular movement in a vertical plane longitudinal of said body, handle means secured to said rod above said guide means, drive mechanism connecting said rod to said driving wheels to cause rotation of said driving wheels upon forward and backward angular movement of said rod, said drive mechanism including a detachable connecting rod member, and means for securing said upwardly extending rod to said body to prevent said relative angular movement of said rod.

VINCENT MARASCO.

REFERENCES CITED

The following references are of record in the file of this patent:

UNITED STATES PATENTS

| Number | Name | Date |
|---|---|---|
| 279,541 | Cox | June 19, 1883 |
| 941,121 | Worthington | Nov. 23, 1909 |
| 1,308,270 | Barrellier | July 1, 1919 |
| 1,385,815 | Collins | July 26, 1921 |
| 1,387,281 | McCarthy et al. | Aug. 9, 1921 |
| 1,743,121 | Edele | Jan. 14, 1930 |